(12) United States Patent
Chuang

(10) Patent No.: US 11,258,629 B2
(45) Date of Patent: Feb. 22, 2022

(54) CONTROLLING SYSTEM FOR ELECTRIC BICYCLE AND METHOD THEREOF

(71) Applicant: Hyena Inc., Taichung (TW)

(72) Inventor: Yu-Ting Chuang, Taichung (TW)

(73) Assignee: Hyena Lic., Taichung (TW)

(*) Notice: Subject to any disclaimer, the term of this patent is extended or adjusted under 35 U.S.C. 154(b) by 334 days.

(21) Appl. No.: 16/439,687

(22) Filed: Jun. 12, 2019

(65) Prior Publication Data

US 2020/0092128 A1  Mar. 19, 2020

Related U.S. Application Data

(60) Provisional application No. 62/732,582, filed on Sep. 18, 2018.

(30) Foreign Application Priority Data

Feb. 15, 2019 (TW) ................................. 108105193

(51) Int. Cl.
*H04L 12/40* (2006.01)
*B62M 6/40* (2010.01)

(52) U.S. Cl.
CPC .............. *H04L 12/40* (2013.01); *B62M 6/40* (2013.01); *H04L 2012/40215* (2013.01)

(58) Field of Classification Search
CPC ......... H04L 12/40; H04L 2012/40215; B62M 6/40
See application file for complete search history.

(56) References Cited

U.S. PATENT DOCUMENTS 10,489,543 B1 * 11/2019 Lysaght ................. G06F 30/331
10,701,102 B2 * 6/2020 Zeng ..................... H04L 9/0643
(Continued)

FOREIGN PATENT DOCUMENTS

| CN | 105573807 A | 5/2016 |
| CN | 108137124 A | 6/2018 |

(Continued)

OTHER PUBLICATIONS

Softing, "CANpro USB CAN-Bus USB-Interface for Vehicle Electronics", published on Nov. 3, 2016, pp. 1-2, accessed at https://automotive.softing.com/fileadmin/sof-files/pdf/ae/data_sheets/vci/can/Softing-DB_CANproUSB_D.pdf.

(Continued)

*Primary Examiner* — Henry Tsai
*Assistant Examiner* — Aurangzeb Hassan
(74) *Attorney, Agent, or Firm* — CKC & Partners Co., LLC

(57) ABSTRACT

A controlling system for an electric bicycle is connected to a CAN bus of the electric bicycle and a controlling end, and configured to control a plurality of electric elements which are signally connected to the CAN bus. A dongle module includes a first connecting port, a dongle and a second connecting port. The controlling end is configured to transmit a USB signal to the first connecting port. One end of the dongle is coupled to the first connecting port, and the dongle is configured to convert the USB signal into a CAN signal. The second connecting port is coupled to another end of the dongle. A console includes a console port. The console port is detachably connected to the second connecting port and coupled to the CAN bus. The CAN signal is transmitted to the CAN bus via the second connecting port and the console port.

7 Claims, 9 Drawing Sheets

(56) References Cited

U.S. PATENT DOCUMENTS

| | | | | |
|---|---|---|---|---|
| 2010/0130986 A1* | 5/2010 | Mailloux | ............... | A61B 34/30 606/130 |
| 2011/0074214 A1* | 3/2011 | Takao | ................... | B60L 15/20 307/38 |
| 2011/0137510 A1* | 6/2011 | Tsai | ....................... | G07C 5/008 701/31.4 |
| 2012/0049483 A1* | 3/2012 | Dodman | ............... | B62K 19/34 280/281.1 |
| 2012/0272209 A1* | 10/2012 | Biglari | .................... | G06F 8/30 717/105 |
| 2013/0018537 A1* | 1/2013 | Arad | .................... | B60Q 5/008 701/22 |
| 2015/0073647 A1* | 3/2015 | Ubik | ..................... | G07C 5/008 701/29.1 |
| 2016/0226107 A1* | 8/2016 | Worry | ................ | H01M 10/4207 |
| 2017/0200324 A1* | 7/2017 | Chennakeshu | ... | H04L 12/40104 |
| 2017/0208074 A1* | 7/2017 | Meng | ................. | H04L 63/107 |
| 2017/0246466 A1* | 8/2017 | Murphy | ................ | A61N 1/3904 |
| 2018/0268621 A1* | 9/2018 | Oz | ..................... | G06Q 30/0278 |
| 2019/0020936 A1* | 1/2019 | Phillips | ................. | G01D 21/00 |
| 2019/0230401 A1* | 7/2019 | Chamberlain | ...... | H04N 21/4668 |
| 2020/0060603 A1* | 2/2020 | Bower | ................... | G16H 20/70 |
| 2021/0203444 A1* | 7/2021 | Koyama | .............. | H04L 1/1614 |

FOREIGN PATENT DOCUMENTS

| | | |
|---|---|---|
| DE | 202014105747 U1 | 1/2015 |
| DE | 102015016602 A1 | 6/2017 |
| TW | I440571 B | 6/2014 |

OTHER PUBLICATIONS

Abhijit D. Sutar et al., "ECU Health Monitor Using CANUSB", 2018 Second International Conference on Inventive Communication and Computational Technologies (ICICCT 2018), published on Apr. 20-21, 2018, pp. 415-419, published by IEEE, India.

* cited by examiner

CONTROLLING SYSTEM FOR ELECTRIC BICYCLE AND METHOD THEREOF

RELATED APPLICATIONS

This application claims priority to U.S. Provisional Application Ser. No. 62/732,582, filed Sep. 18, 2018, and Taiwan Application Serial Number 108105193, filed Feb. 15, 2019, the disclosures of which are incorporated herein by reference in their entireties.

BACKGROUND

Technical Field

The present disclosure relates to a controlling system for an electric bicycle and a method thereof. More particularly, the present disclosure relates to a controlling system for an electric bicycle and a method thereof which are capable of achieving practicality and convenience.

Description of Related Art

Modern electric bicycles use an increasing number of electric elements that require electronic controls or programmed modules. In many cases, the electric elements are connected to a console and communicated with a controlling end by the console. In general, the console is equipped on the electric bicycle and includes a signal conversion circuit to decode signal transmission with different interface. For example, signal conversion between a universal serial bus (USB) signal and a controller area network (CAN) signal. However, when the console is damaged, a repairer needs to remove and replace the console. The repairer needs to move or remove wires for testing, so that it is quite troublesome and time-consuming. In addition, when the console is damaged, the repairer cannot control (turn on/off) the electric elements via the console. Hence, a normal console must be reinstalled to test the electric elements, and the processing steps are increased and inconvenient. Because the console includes the signal conversion circuit, the hardware complexity and volume of the console is increased. If each electric bicycle is equipped with such the console, the cost is relatively high. Therefore, a controlling system for an electric bicycle and a method thereof having the features of low hardware complexity of the console and reinforce flexibility of the electric elements without removing wires for testing are commercially desirable.

SUMMARY

According to one aspect of the present disclosure, a controlling system for an electric bicycle is connected to a controller area network (CAN) bus of the electric bicycle and a controlling end, and configured to control a plurality of electric elements which are signally connected to the CAN bus. The controlling system for the electric bicycle includes a dongle module and a console. The dongle module includes a first connecting port, a dongle and a second connecting port. The first connecting port is connected to the controlling end, and the controlling end is configured to transmit a universal serial bus (USB) signal to the first connecting port. One end of the dongle is coupled to the first connecting port, and the dongle is configured to convert the USB signal into a CAN signal. The second connecting port is coupled to another end of the dongle. The console includes a console port. The console port is detachably connected to the second connecting port and coupled to the CAN bus. The CAN signal is transmitted to the CAN bus via the second connecting port and the console port.

According to another aspect of the present disclosure, a controlling method for an electric bicycle is configured to enable a controlling end to control a plurality of electric elements of the electric bicycle. The controlling method for the electric bicycle includes a signal converting step and a signal controlling step. The signal converting step is for driving a dongle module to convert a universal serial bus (USB) signal of the controlling end into a controller area network (CAN) signal. The USB signal is transmitted to a dongle via a first connecting port of the dongle module, and the dongle is configured to convert the USB signal into the CAN signal. The signal controlling step is for driving a console to transmit the CAN signal to a CAN bus via a second connecting port of the dongle module and a console port of the console so as to control the electric elements which are signally connected to the CAN bus.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or module) is referred to as be "disposed on" or "connected to" another element, it can be directly disposed on or connected to the other element, or it can be indirectly disposed on or connected to the other element, that is, intervening elements may be present. In contrast, when an element is referred to as be "directly disposed on" or "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
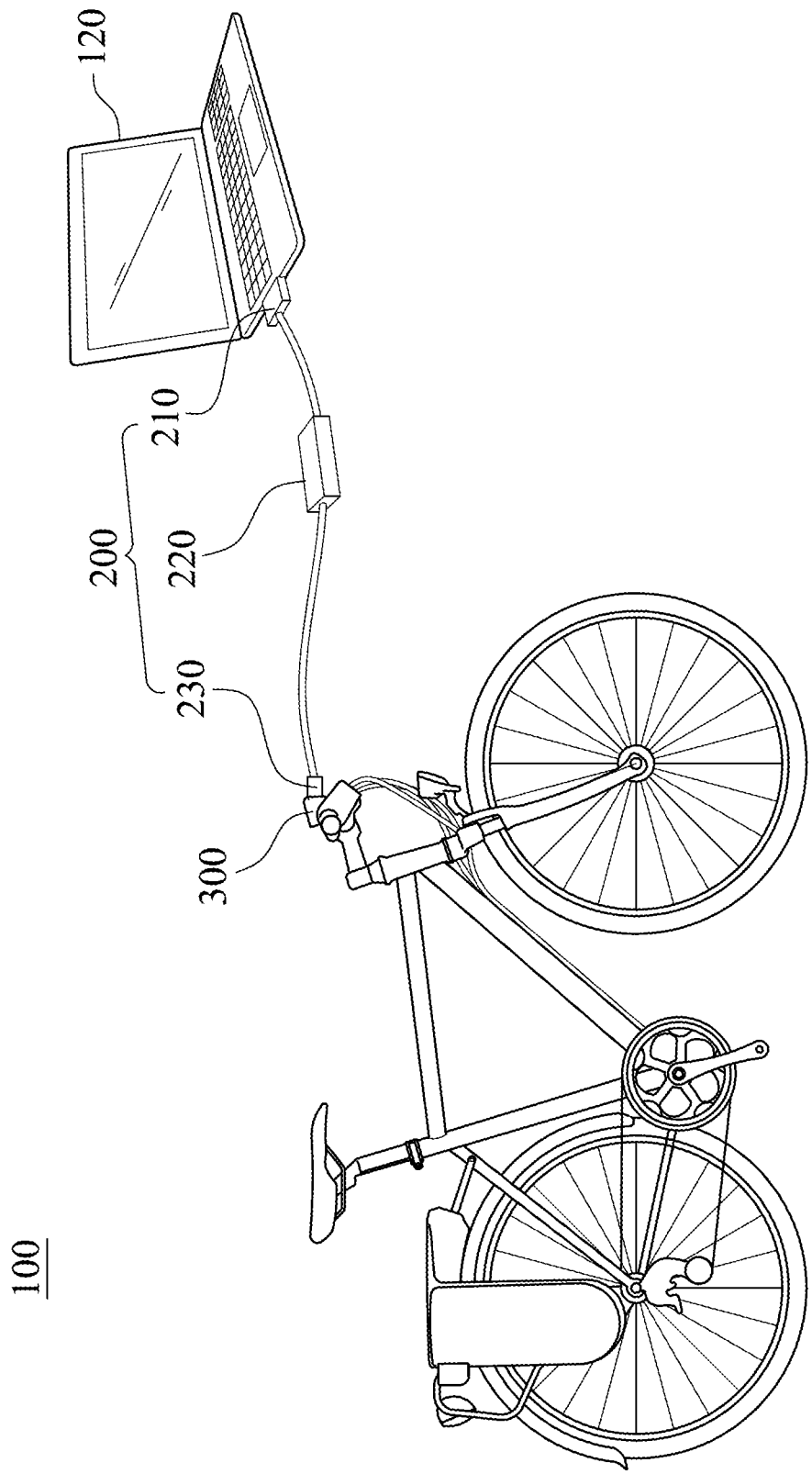
FIG. 1 shows a schematic view of a controlling system for an electric bicycle according to a first embodiment of the present disclosure.
Figure 2:
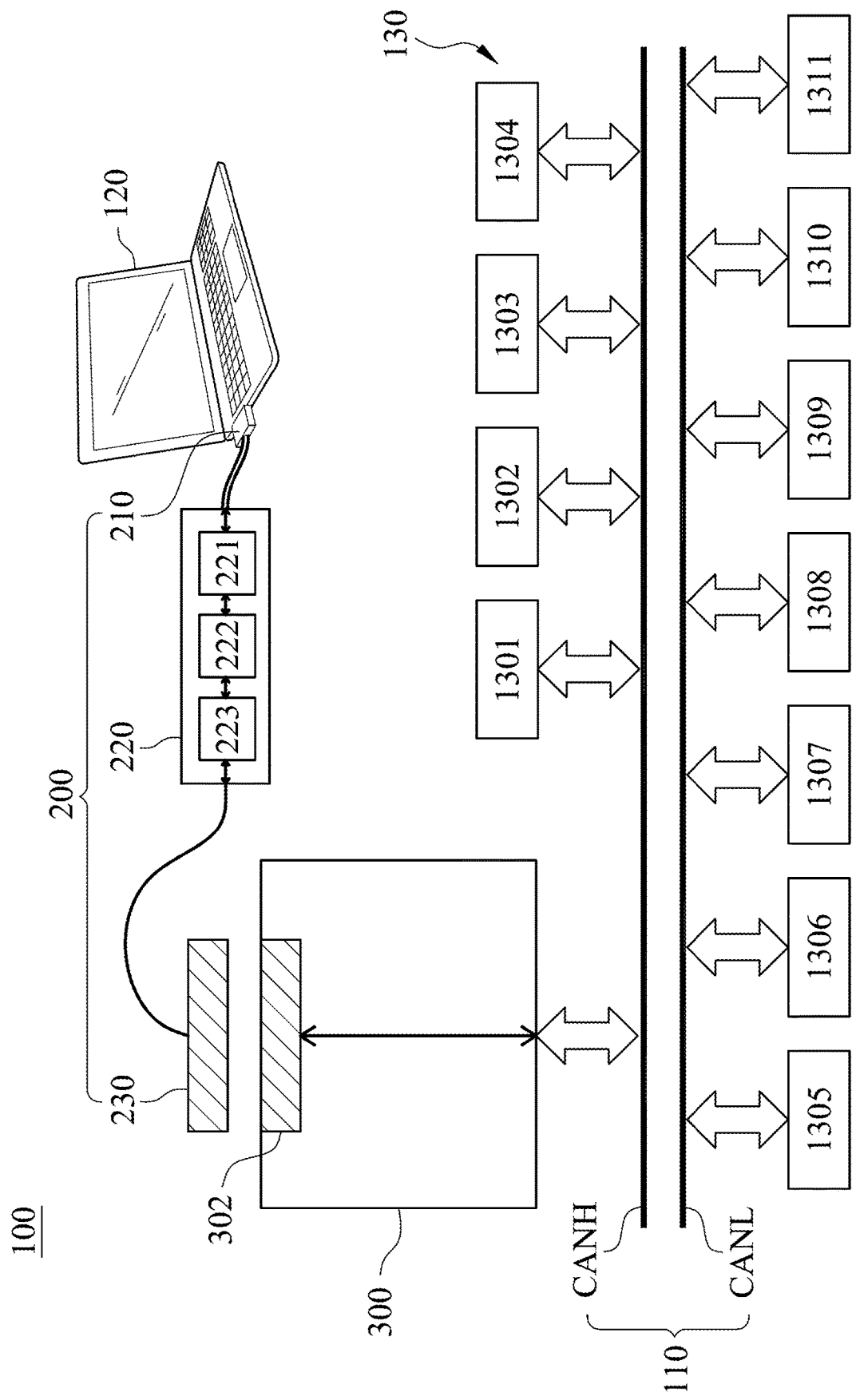
FIG. 2 shows a schematic block view of a dongle, a console and a CAN bus of FIG. 1.

FIG. 1 shows a schematic view of a controlling system 100 for an electric bicycle according to a first embodiment of the present disclosure. FIG. 2 shows a schematic block view of a dongle 220, a console 300 and a controller area network (CAN) bus of FIG. 1. Referring to FIGS. 1 and 2, the controlling system 100 for the electric bicycle is connected to the CAN bus 110 of the electric bicycle and a controlling end 120, and configured to control a plurality of electric elements 130 which are signally connected to the CAN bus 110. The CAN bus 110 includes two signal lines CANH, CANL. The controlling system 100 for the electric bicycle includes a dongle module 200 and the console 300.

The dongle module 200 includes a first connecting port 210, the dongle 220 and a second connecting port 230. The first connecting port 210 is connected to the controlling end 120, and the controlling end 120 transmits a universal serial bus (USB) signal to the first connecting port 210. One end of the dongle 220 is coupled to the first connecting port 210, and the dongle 220 is configured to convert the USB signal into a CAN signal. The second connecting port 230 is coupled to another end of the dongle 220. In detail, the controlling end 120 may be a computer or a mobile device. The electric elements 130 includes a display 1301, a battery 1302, a driver 1303, a motor 1304, a light 1305, a lock 1306, a sensor 1307, an anti-lock brake system 1308 (ABS), a shifter 1309, an Internet of Things (IoT) device 1310 and a tire pressure monitoring system 1311 (TPMS). The first connecting port 210 is a USB port. The first connecting port 210 can be a USB Type-A port or a USB Type-C port. The second connecting port 230 is the USB Type-A port (e.g., USB 3.0 Type-A port) or the USB Type-C port (e.g., USB 3.0 Type-C port). A console port 320 of the console 300 is corresponding to the second connecting port 230. In other words, the console port 320 and the second connecting port 230 are of the same type. In addition, the dongle 220 includes a USB processing unit 221, a dongle processor 222 and a CAN processing unit 223. The USB processing unit 221 is connected to the first connecting port 210. The USB processing unit 221 is configured to convert the USB signal into a payload signal. The dongle processor 222 is connected to the USB processing unit 221. The dongle processor 222 is configured to convert the payload signal into a CAN pre-signal. The CAN processing unit 223 is connected to the dongle processor 222. The CAN processing unit 223 is configured to convert the CAN pre-signal into the CAN signal.

The console 300 includes a console port 302. The console port 302 is detachably connected to the second connecting port 230 and coupled to the CAN bus 110. The CAN signal is transmitted to the CAN bus 110 via the second connecting port 230 and the console port 302. Therefore, the controlling system 100 for the electric bicycle of the present disclosure not only can reduce the hardware complexity of the console 300 by signal conversion between the USB signal and the CAN signal in the dongle 220, but also can reinforce flexibility of the CAN bus 110. In addition, a repairer does not need to remove wires for testing.

Figure 3:
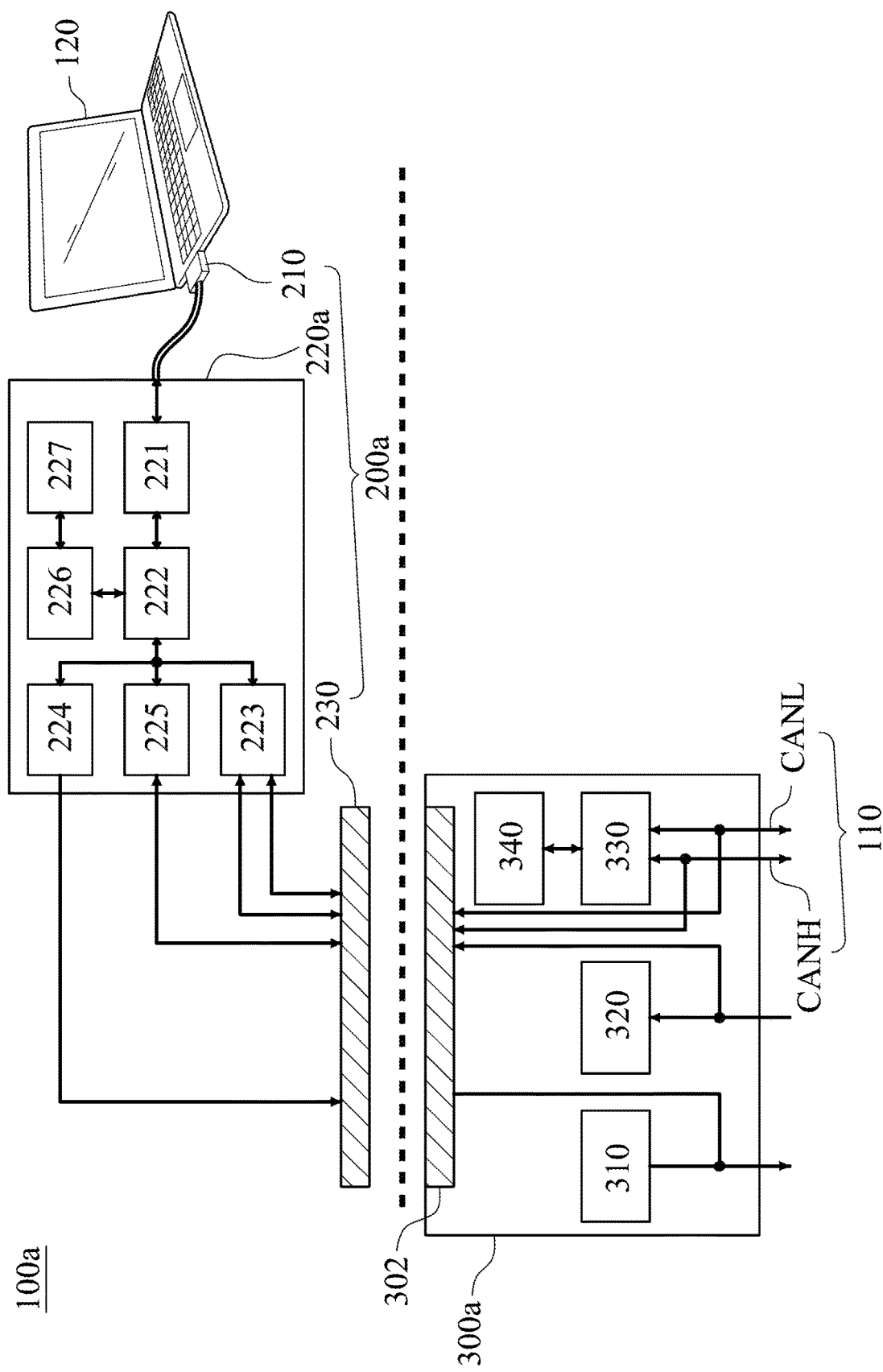
FIG. 3 shows a schematic block view of a controlling system for an electric bicycle according to a second embodiment of the present disclosure.
Figure 4:
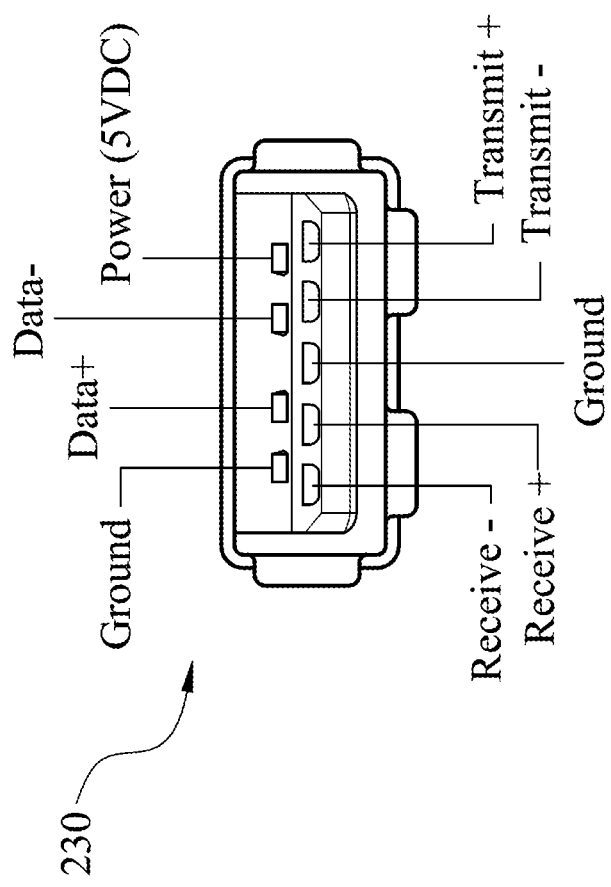
FIG. 4 shows a schematic view of a second connecting port being a USB Type-A port of FIG. 3.
Figure 5:
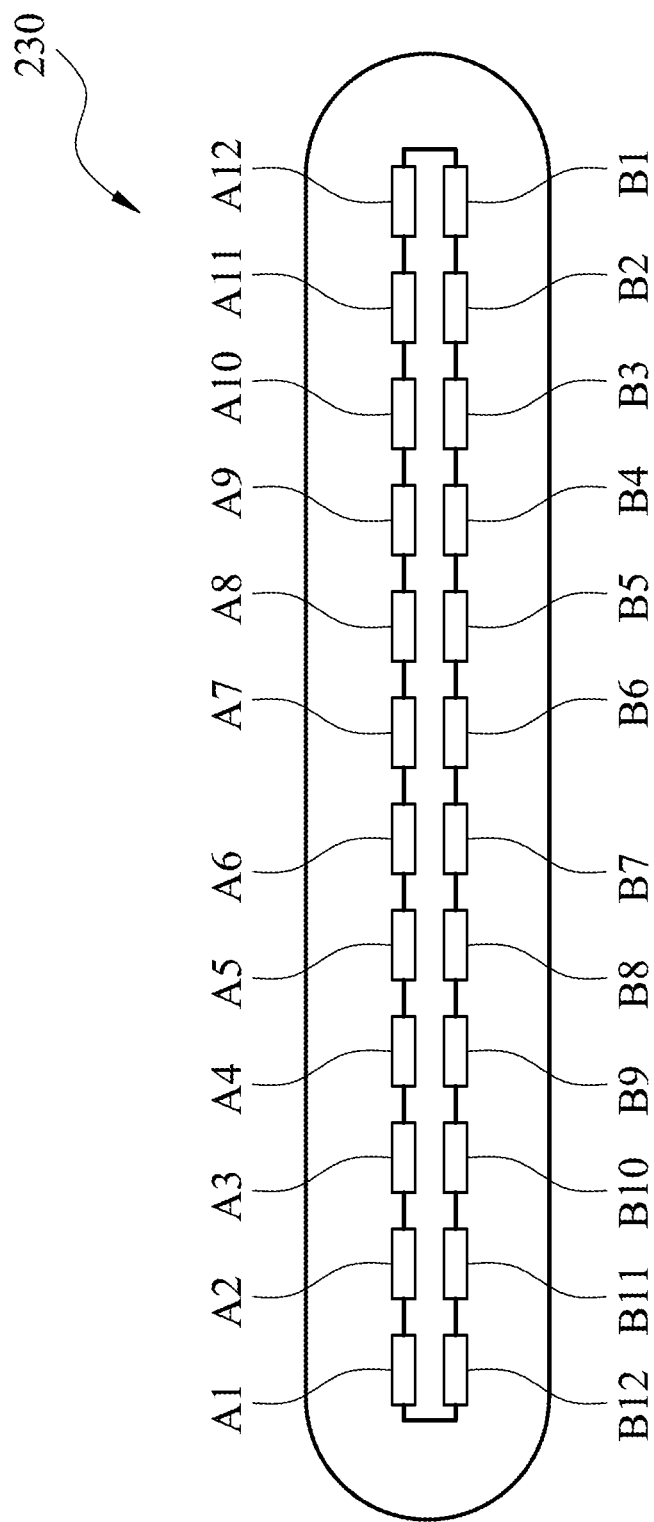
FIG. 5 shows a schematic view of a second connecting port being a USB Type-C port of FIG. 3.

FIG. 3 shows a schematic block view of a controlling system 100a for an electric bicycle according to a second embodiment of the present disclosure. FIG. 4 shows a schematic view of a second connecting port 230 being a USB Type-A port of FIG. 3. FIG. 5 shows a schematic view of a second connecting port 230 being a USB Type-C port of FIG. 3. Referring to FIGS. 3, 4 and 5, the controlling system 100a for the electric bicycle is connected to a CAN bus 110 of the electric bicycle and a controlling end 120. The controlling system 100a for the electric bicycle includes a dongle module 200a and a console 300a.

The dongle module 200a includes a first connecting port 210, a dongle 220a and a second connecting port 230. The dongle 220a includes a USB processing unit 221, a dongle processor 222, a CAN processing unit 223, a power control unit 224, a power monitoring unit 225, a storage unit 226 and a dongle power unit 227. In FIG. 3, the detail of the first connecting port 210, the second connecting port 230, the USB processing unit 221, the dongle processor 222 and the CAN processing unit 223 is the same as the embodiments of FIG. 2, and will not be described again herein. In FIG. 3, the dongle module 200a further includes the power control unit 224, the power monitoring unit 225, the storage unit 226 and the dongle power unit 227. The power control unit 224 is connected to the dongle processor 222 and configured to generate a power control signal. The power control unit 224 is configured to convert the CAN pre-signal of the dongle processor 222 into the power control signal, and transmit the power control signal to the console 300a via the second connecting port 230. The power monitoring unit 225 is connected to the dongle processor 222 and configured to receive a voltage signal of each of the electric elements 130. The power monitoring unit 225 is configured to convert the voltage signal into the CAN pre-signal and transmit the CAN pre-signal to the dongle processor 222. The storage unit 226 is connected to the dongle processor 222 and configured to store various types of signals. The dongle power unit 227 is connected to the storage unit 226. The dongle power unit 227 is configured to control powers of the USB processing unit 221, the dongle processor 222, the CAN processing unit 223, the power control unit 224, the power monitoring unit 225 and the storage unit 226 so as to operate properly. In addition, Table 1 lists a relative relationship between eight kinds of signal lines used in the controlling system 100a for the electric bicycle and eight kinds of pins of a USB port. When the second connecting port 230 is the USB Type-A port, the second connecting port 230 has nine pins, i.e., Power(5VDC), Data+, Data−, Ground, Transmit−, Transmit+, Ground, Receive− and Receive+. Two of the nine pins (Transmit−, Transmit+) are coupled to the two signal lines CANH, CANL of the CAN bus 110, respectively, as shown in FIG. 4 and listed in columns 1 and 2 of Table 1. Since there are two grounds in the nine pins, the nine pins can be divided into the eight kinds of pins. Furthermore, when the second connecting port 230 is the USB Type-C port, the second connecting port 230 has twenty-four pins, i.e., A1(GND), A2(TX1+), A3(TX1−), A4(VBUS), A5(CC1), A6(D+), A7(D−), A8(SBU1), A9(VBUS), A10(RX2−), A11(RX2+), A12(GND), B1(GND), B2(TX2+), B3(TX2−), B4(VBUS), B5(CC2), B6(D+), B7(D−), B8(SBU2), B9(VBUS), B10(RX1−), B11 (RX1+) and B12(GND). Two of the twenty-four pins (TX1/2+, TX1/2−) are coupled to the two signal lines CANH, CANL of the CAN bus 110, respectively, as shown in FIG. 5 and listed in columns 1 and 3 of Table 1. The signal lines can transmit signals in both directions.

TABLE 1

| Signal lines | Pins of USB Type-A port | Pins of USB Type-C port |
| --- | --- | --- |
| 5 V | Power (5 VDC) | VBUS |
| D+ | Data+ | D+ |
| D− | Data− | D− |
| GND | Ground | GND |
| CANL | Transmit− | TX1/2+ |
| CANN | Transmit+ | TX1/2− |
| 12 V | Receive− | RX1/2− |
| HMI/DEN | Receive+ | RX1/2+ |

The console 300a includes a console port 302, a power switch controller 310, a console power management unit 320, a CAN transceiver 330 and a console processor 340. The console port 302 is connected to the power switch controller 310, the console power management unit 320 and the CAN transceiver 330. The power switch controller 310 is coupled to the power control unit 224 via the console port 302 and the second connecting port 230. The power switch controller 310 is configured to turn on or turn off each of the electric elements 130 according to the power control signal. The console power management unit 320 is coupled to the power monitoring unit 225 via the console port 302 and the second connecting port 230. The console power management unit 320 is configured to receive the voltage signal of each of the electric elements 130. Moreover, the CAN transceiver 330 is coupled to the CAN processing unit 223 via the console port 302 and the second connecting port 230. The CAN transceiver 330 is connected to the CAN processing unit 223 and each of the electric elements 130 via the two signal lines CANN, CANL of the CAN bus 110. The console processor 340 is connected to the CAN transceiver 330 so as to generate the CAN signal. Therefore, the controlling system 100a for the electric bicycle of the present disclosure not only can reduce the hardware complexity of the console 300a by signal conversion between the USB signal and the CAN signal in the dongle 220a, but also can reinforce flexibility of the CAN bus 110. The repairer does not need to remove wires for testing. In addition, when the console 300a is damaged, the controlling system 100a for the electric bicycle of the present disclosure can still continue to test by the dongle 220a, thereby achieving practicality and convenience.

Figure 6:
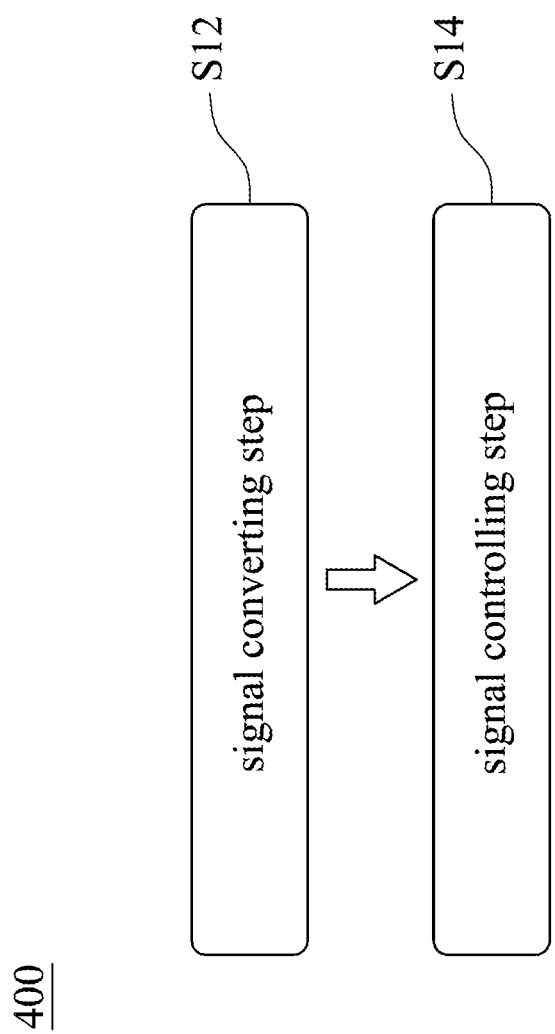
FIG. 6 shows a flow chart of a controlling method for an electric bicycle according to a third embodiment of the present disclosure.

FIG. 6 shows a flow chart of a controlling method 400 for an electric bicycle according to a third embodiment of the present disclosure. Referring to FIGS. 2, 3 and 6, the controlling method 400 for the electric bicycle is configured to enable a controlling end 120 to control a plurality of electric elements 130 of the electric bicycle. The controlling method 400 for the electric bicycle may be applied to the controlling system 100 (or 100a) for the electric bicycle and include a signal converting step S12 and a signal controlling step S14. The signal converting step S12 is for driving a dongle module 200 (or 200a) to convert a universal serial bus (USB) signal of the controlling end 120 into a controller area network (CAN) signal. The USB signal is transmitted to a dongle 220 (or 220a) via a first connecting port 210 of the dongle module 200 (or 200a), and the dongle 220 (or 220a) is configured to convert the USB signal into the CAN signal. In addition, the signal controlling step S14 is for driving a console 300 (or 300a) to transmit the CAN signal to a CAN bus 110 via a second connecting port 230 of the dongle module 200 (or 200a) and a console port 302 of the console 300 (or 300a) so as to control the electric elements 130 which are signally connected to the CAN bus 110. Accordingly, the controlling method 400 for the electric bicycle of the present disclosure can efficiently and conveniently control the electric elements 130 by signal conversion between the USB signal and the CAN signal in the dongle 200 (or 220a) and reinforce flexibility of the CAN bus 110. Moreover, the repairer does not need to remove wires for testing.

Figure 7:
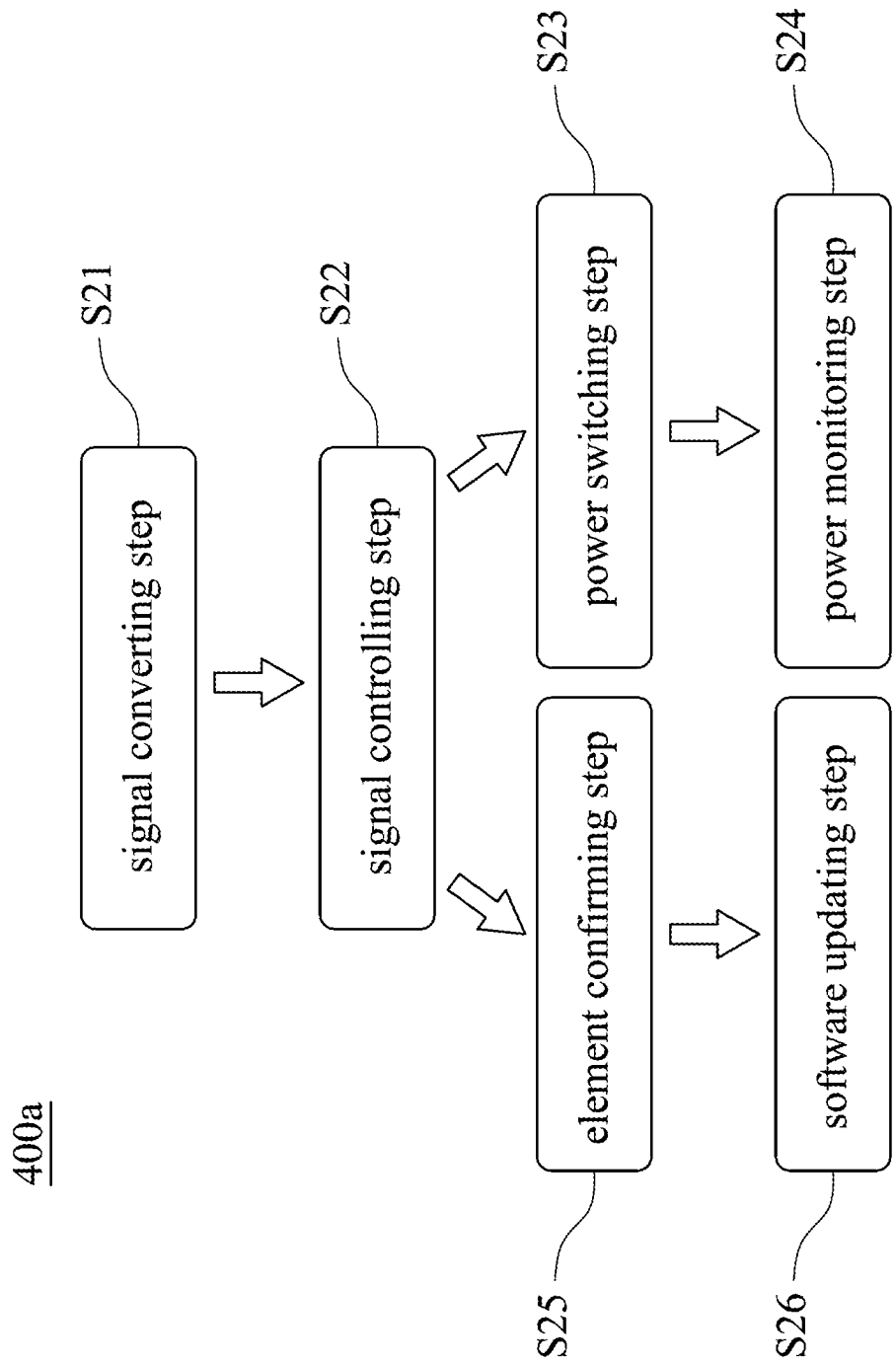
FIG. 7 shows a flow chart of a controlling method for an electric bicycle according to a fourth embodiment of the present disclosure.

FIG. 7 shows a flow chart of a controlling method 400a for an electric bicycle according to a fourth embodiment of the present disclosure. Referring to FIGS. 3 and 7, the controlling method 400a for the electric bicycle may be applied to the controlling system 100a for the electric bicycle and include a signal converting step S21, a signal controlling step S22, a power switching step S23, a power monitoring step S24, an element confirming step S25 and a software updating step S26.

In FIG. 7, the detail of the signal converting step S21 and the signal controlling step S22 is the same as the signal converting step S12 and the signal controlling step S14 of FIG. 6 respectively, and will not be described again herein. In FIG. 7, the controlling method 400a for the electric bicycle further includes the power switching step S23, the power monitoring step S24, the element confirming step S25 and the software updating step S26. The power switching step S23 is for driving a power control unit 224 of the dongle 220a to generate a power control signal, and then driving a power switch controller 310 of the console 300a to turn on or turn off each of the electric elements 130 according to the power control signal. The power monitoring step S24 is for driving a power monitoring unit 225 of the dongle 220a and a console power management unit 320 of the console 300a to receive a voltage signal of each of the electric elements 130 so as to enable the controlling end 120 to monitor the electric elements 130. Furthermore, the element confirming step S25 is for enabling the controlling end 120 to confirm whether each of the electric elements 130 exists in the controlling system 100a via the dongle module 200a, the console 300a and the CAN bus 110. The software updating step S26 is for enabling the controlling end 120 to convert an updating message corresponding to one of the electric elements 130 into the USB signal, and the one of the electric elements 130 exists in the controlling system 100a. Then, the controlling end 120 transmits the USB signal to the dongle module 200a. The dongle module 200a transmits the CAN signal corresponding to the updating message to the console 300a, and then the CAN signal corresponding to the updating message is transmitted to the one of the electric elements 130 via the CAN bus 110. Therefore, the controlling method 400a for the electric bicycle of the present disclosure not only can reinforce flexibility of the CAN bus 110, but also can avoid a problem of a conventional controlling method that the console cannot communicate with a newly added electric element 130. When the console 300a is damaged, the controlling system of the present disclosure can still apply power to the electric element 130 by the dongle 220a and continue to test. The repairer does not need to change the console 300a and remove wires for testing, thus being quite convenient for the repairer. In addition, the electric element 130 that needs to be updated can be updated to a new version via the dongle 220a and the CAN bus 110 without worrying about a problem of disconnection when the electric element 130 does not be updated.

Figure 8:
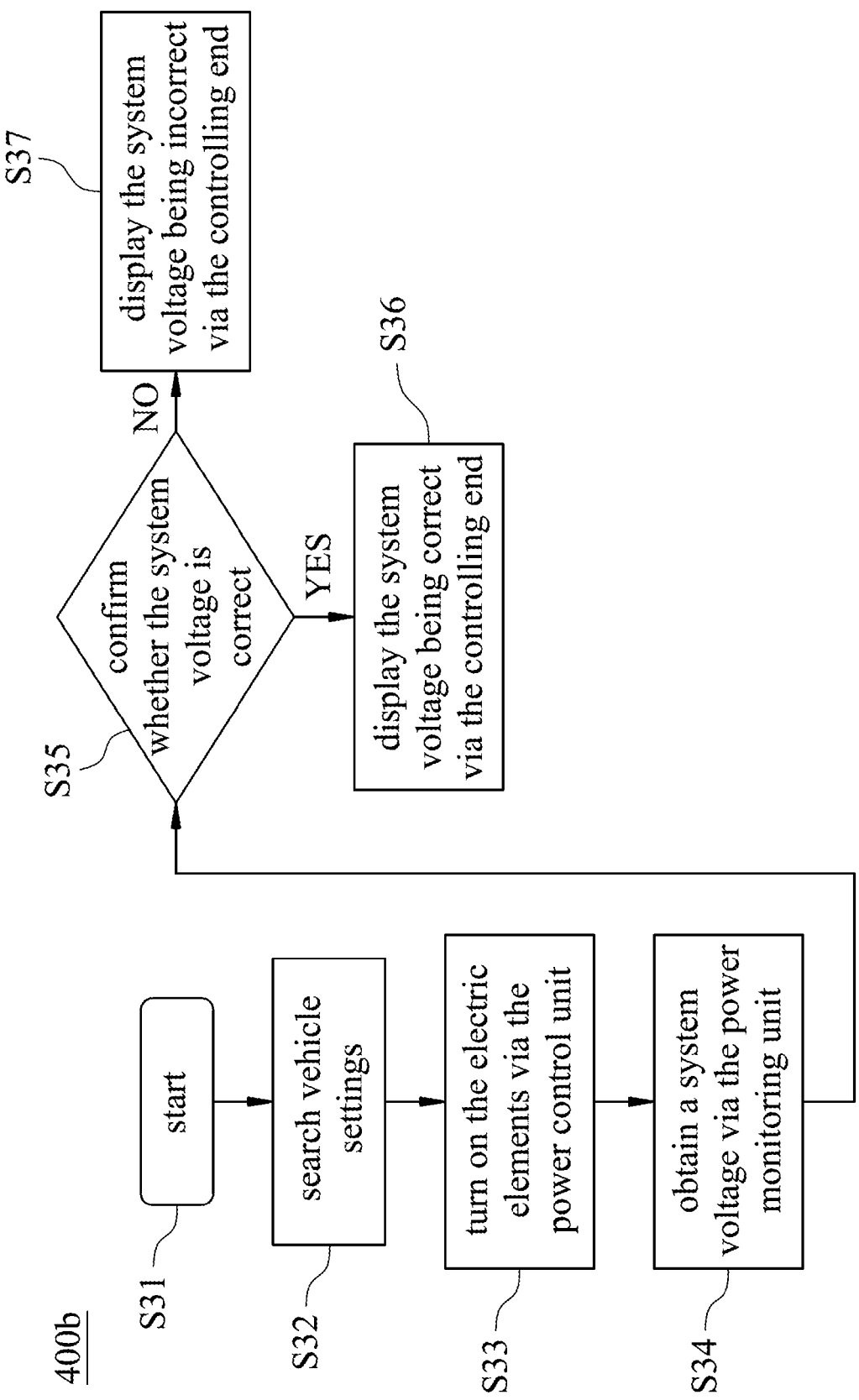
FIG. 8 shows a flow chart of a controlling method for an electric bicycle according to a fifth embodiment of the present disclosure.

FIG. 8 shows a flow chart of a controlling method 400b for an electric bicycle according to a fifth embodiment of the present disclosure. Referring to FIGS. 3, 7 and 8, the controlling method 400b for the electric bicycle may be applied to the controlling system 100a for the electric bicycle and include a plurality of steps S31, S32, S33, S34, S35, S36, S37. The step S31 is for starting the controlling system 100a. The step S32 is for searching vehicle settings, i.e., searching the settings of each of the electric elements 130 and the console 300a. The step S33 is for turning on the electric elements 130 via the power control unit 224. The step S34 is for obtaining a system voltage via the power monitoring unit 225. The step S35 is for confirming whether the system voltage is correct. If YES, the step S36 is performed. If No, the step S37 is performed. The step S36 is for displaying the system voltage being correct via the controlling end 120. The step S37 is for displaying the system voltage being incorrect via the controlling end 120. Hence, the controlling method 400b for the electric bicycle of the present disclosure can turn on or turn off each of the electric elements 130 by the steps S31-S37 and monitor the system voltage via the controlling end 120.

Figure 9:
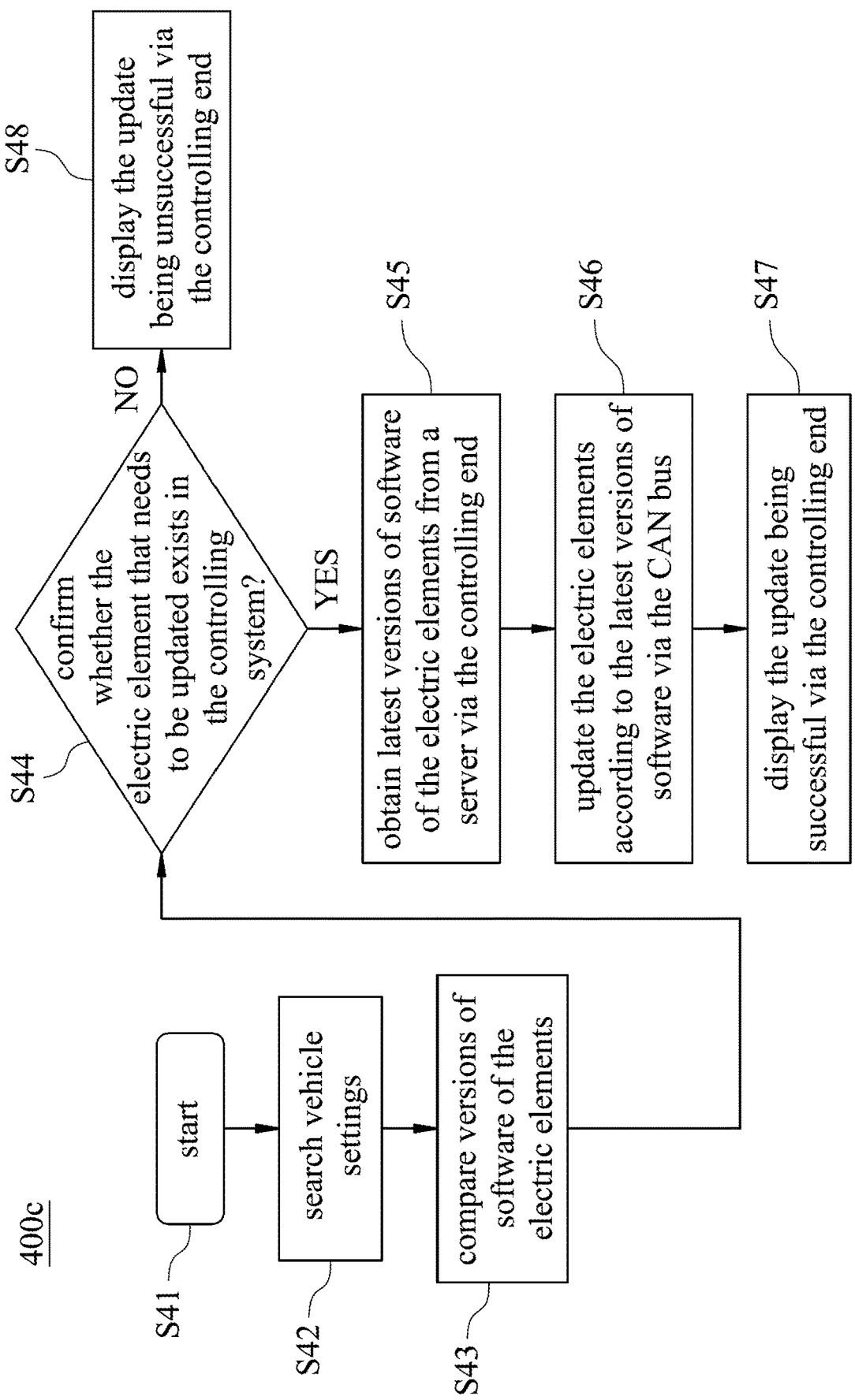
FIG. 9 shows a flow chart of a controlling method for an electric bicycle according to a sixth embodiment of the present disclosure.

FIG. 9 shows a flow chart of a controlling method 400c for an electric bicycle according to a sixth embodiment of the present disclosure. The controlling method 400c for the electric bicycle may be applied to the controlling system 100a for the electric bicycle and include a plurality of steps S41, S42, S43, S44, S45, S46, S47, S48. The step S41 is for starting the controlling system 100a. The step S42 is for searching vehicle settings, i.e., searching the settings of each of the electric elements 130 and the console 300a. The step S43 is for comparing versions of software of the electric elements 130. The step S44 is for confirming whether the electric element 130 that needs to be updated exists in the controlling system 100a. If YES, the steps S45-S47 are performed. If NO, the step S48 is performed. The step S45 is for obtaining latest versions of software of the electric elements 130 from a server via the controlling end 120. The step S46 is for updating the electric elements 130 according to the latest versions of software via the CAN bus 110. The step S47 is for displaying the update being successful via the controlling end 120. The step S48 is for displaying the update being unsuccessful via the controlling end 120. Accordingly, the controlling method 400c for the electric bicycle of the present disclosure can reinforce flexibility of the CAN bus 110 and instantaneously update the electric elements 130 according to the latest versions of software.

According to the aforementioned embodiments and examples, the advantages of the present disclosure are described as follows.

1. The controlling system for the electric bicycle of the present disclosure not only can reduce the hardware complexity of the console 300a by signal conversion between the USB signal and the CAN signal in the dongle, but also can reinforce flexibility of the CAN bus. In addition, the repairer does not need to remove wires for testing.

2. When the console is damaged, the controlling system of the present disclosure can still apply power to the electric element by the dongle and continue to test. The repairer does not need to change the console and remove wires for testing, thus being quite convenient for the repairer.

3. In the present disclosure, the electric element that needs to be updated can be updated to a new version via the dongle and the CAN bus without worrying about a problem of disconnection when the electric element does not be updated.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A controlling system for an electric bicycle, which is connected to a controller area network (CAN) bus of the electric bicycle and a controlling end, and configured to control a plurality of electric elements which are signally connected to the CAN bus, wherein the electric elements comprise one or more of an anti-lock brake system, a tire pressure monitoring system and a shifter, the controlling system for the electric bicycle comprising:
   a dongle module comprising:
      a first connecting port connected to the controlling end, wherein the controlling end is configured to transmit a universal serial bus (USB) signal to the first connecting port;
      a dongle, wherein one end of the dongle is coupled to the first connecting port, and the dongle is configured to convert the USB signal into a CAN signal; and
      a second connecting port coupled to another end of the dongle; and
   a console comprising a console port, wherein the console port is detachably connected to the second connecting port and coupled to the CAN bus;
   wherein the CAN signal is transmitted to the CAN bus via the second connecting port and the console port;
   wherein the dongle comprises:
      a USB processing unit connected to the first connecting port, wherein the USB processing unit is configured to convert the USB signal into a payload signal;
      a dongle processor connected to the USB processing unit, wherein the dongle processor is configured to convert the payload signal into a CAN pre-signal;
      a CAN processing unit connected to the dongle processor, wherein the CAN processing unit is configured to convert the CAN pre-signal into the CAN signal;
      a power control unit connected to the dongle processor and configured to generate a power control signal; and
      a power monitoring unit connected to the dongle processor and configured to receive a voltage signal of each of the electric elements; and
   the console further comprises:
      a power switch controller coupled to the power control unit via the console port and the second connecting port, wherein the power switch controller is configured to turn on or turn off each of the electric elements according to the power control signal; and
      a console power management unit coupled to the power monitoring unit via the console port and the second connecting port, wherein the console power management unit is configured to receive the voltage signal of each of the electric elements.

2. The controlling system for the electric bicycle of claim 1, wherein the first connecting port is a USB Type-A port or a USB Type-C port, the second connecting port is the USB Type-A port or the USB Type-C port, and the console port is corresponding to the second connecting port.

3. The controlling system for the electric bicycle of claim 2, wherein,
   when the second connecting port is the USB Type-A port, the second connecting port has nine pins, and two of the nine pins are coupled to the CAN bus; and when the second connecting port is the USB Type-C port, the second connecting port has twenty-four pins, and two of the twenty-four pins are coupled to the CAN bus.

4. A controlling method for an electric bicycle, which is configured to enable a controlling end to control a plurality of electric elements of the electric bicycle, wherein the electric elements comprise one or more of an anti-lock brake system, a tire pressure monitoring system and a shifter, the controlling method for the electric bicycle comprising:

providing a signal converting step, wherein the signal converting step is for driving a dongle module to convert a universal serial bus (USB) signal of the controlling end into a controller area network (CAN) signal, the USB signal is transmitted to a dongle via a first connecting port of the dongle module, and the dongle is configured to convert the USB signal into the CAN signal;

providing a signal controlling step, wherein the signal controlling step is for driving a console to transmit the CAN signal to a CAN bus via a second connecting port of the dongle module and a console port of the console so as to control the electric elements which are signally connected to the CAN bus;

providing a power switching step, wherein the power switching step is for driving a power control unit of the dongle to generate a power control signal, and then driving a power switch controller of the console to turn on or turn off each of the electric elements according to the power control signal; and providing a power monitoring step, wherein the power monitoring step is for driving a power monitoring unit of the dongle and a console power management unit of the console to receive a voltage signal of each of the electric elements so as to enable the controlling end to monitor the electric elements.

5. The controlling method for the electric bicycle of claim 4, wherein the first connecting port is a USB Type-A port or a USB Type-C port, the second connecting port is the USB Type-A port or the USB Type-C port, and the console port is corresponding to the second connecting port.

6. The controlling method for the electric bicycle of claim 5, wherein, when the second connecting port is the USB Type-A port, the second connecting port has nine pins, and two of the nine pins are coupled to the CAN bus; and when the second connecting port is the USB Type-C port, the second connecting port has twenty-four pins, and two of the twenty-four pins are coupled to the CAN bus.

7. The controlling method for the electric bicycle of claim 4, further comprising:

providing an element confirming step, wherein the element confirming step is for enabling the controlling end to confirm whether each of the electric elements exists in a controlling system via the dongle module, the console and the CAN bus; and providing a software updating step, wherein the software updating step is for enabling the controlling end to convert an updating message corresponding to one of the electric elements into the USB signal, the one of the electric elements exists in the controlling system, and then the controlling end transmits the USB signal to the dongle module, the dongle module transmits the CAN signal corresponding to the updating message to the console, and then the CAN signal corresponding to the updating message is transmitted to the one of the electric elements via the CAN bus.

\* \* \* \* \*